United States Patent [19]

Smith et al.

[11] 4,207,633

[45] Jun. 17, 1980

[54] INFLATABLE BODY SUPPORT FOR USE WITH BEDPAN

[75] Inventors: Ruby E. Smith, Renton, Wash.; Margj Imel, 1940 N. Jantzen Ave., Portland, Oreg. 97217

[73] Assignee: Margj Imel, Beaverton, Oreg.

[21] Appl. No.: 939,184

[22] Filed: Sep. 5, 1978

[51] Int. Cl.[2] .......................... A61G 7/02; A61C 9/00

[52] U.S. Cl. .............................................. 5/90; 4/456; 5/463

[58] Field of Search ................................ 5/66, 90–92, 5/463, 508; 297/284, 456; 4/112, 113, 116

[56] References Cited

U.S. PATENT DOCUMENTS

| | | | |
|---|---|---|---|
| 1,981,666 | 11/1934 | Ridley | 5/91 |
| 3,253,861 | 5/1961 | Howard | 297/456 |
| 3,605,138 | 9/1971 | Tucker | 5/90 |
| 3,728,744 | 4/1973 | Kimbro, Jr. et al. | 5/90 |

FOREIGN PATENT DOCUMENTS

| | | | |
|---|---|---|---|
| 753936 | 8/1956 | United Kingdom | 297/456 |

*Primary Examiner*—Casmir A. Nunberg
*Attorney, Agent, or Firm*—Chernoff & Vilhauer

[57] ABSTRACT

An inflatable body support to facilitate bedpan use or treatment of pelvic or anal areas of a person confined to a hospital bed or a wheelchair, comprising a generally U-shaped inflatable hip-support cushion defining a space within the "U" thereof for receiving a bedpan or sanitary absorbent material when the hip-supporting cushion is inflated, and a separately inflatable, flexibly attached back support cushion. A flexible folding connection between the hip-support cushion and the back support cushion allows the body support of the invention to be used by persons in wheelchairs or in beds having tiltable or raised portions. A waterproof flexible sheet is attached to and extends under the hip-support cushion and prevents spilled matter from soiling bedding. Detachable flexible tubes interconnect the inflatable cushions, and an uninterrupted seam in the flexible connection between the cushions provides durability and complete separability of inflation between the cushions when desired.

6 Claims, 4 Drawing Figures

INFLATABLE BODY SUPPORT FOR USE WITH BEDPAN

BACKGROUND OF THE INVENTION

This invention relates to improvements in inflatable cushion means for lifting and supporting bedridden patients to allow use of a bedpan or a sanitary absorbent diaper material or to facilitate access for treating the pelvic and anal region.

Hospital patients, because of weakness or immobilization by casts, traction, etc., are frequently unable to leave their beds for normal toilet needs, and therefore require bedpans or absorbent materials. For patients unable to move themselves into appropriate position for use of the bedpan because of weakness, broken bones, or painful sensitivity to being moved, use of the bedpan is often very awkward, difficult or painful, and frequently requires the assistance of more than one hospital attendant to manually lift the patient onto the bedpan. Particularly in the case of very heavy patients, lifting a patient into position for use of a bedpan can be very difficult, and is accompanied by risk of back injury to the attendants who must lean over the side of a bed to lift the patient and place the bedpan.

Similar problems are encountered by persons who are confined to wheelchairs, as for example by paralysis or during recovery from debilitating sickness.

A prior art apparatus employing inflatable means for lifting a patient for bedpan use is disclosed in Kimbro, Jr. U.S. Pat. No. 3,728,744, which discloses a generally U-shaped inflatable cushion for lifting a patient's hips high enough to allow placement of a bedpan. The apparatus of the Kimbro, Jr. patent does not, however, provide corresponding support for the back of the patient. For this reason a patient suffering from back or chest injuries may experience unnecessary pain as the hips, but not the upper portion of the body, are lifted by that prior art device.

The Kimbro, Jr. device includes a large, somewhat rigid, pad-like base to which an inflatable cushion is attached, and the entire pad and inflatable cushion must be inserted beneath the patient for each use of a bedpan. This itself becomes a difficult chore, and does little to relieve hospital attendants of the risk of back injury. The stiffness of the pad of the Kimbro device, if the device were left beneath the patient on a more permanent basis, would interfere with the ability of the head or foot of a hospital bed to be separately raised or tilted to increase patient comfort or accommodate a patient's need to be in a certain position or body attitude to promote healing. Additionally, because of the large, rigid pad-like base, the device is not easily adaptable for use by wheelchair patients.

Another prior device, described in Bowker U.S. Pat. No. 566,724, includes an inflatable cushion for the hips connected to an inflatable rim which forms a sort of bed pan particularly designed for use in obstetrics. The Bowker device includes a flexible segment in the bedpan rim, allowing a portion of the pan to be folded out of the way of a physician or midwife during delivery of a child. Again, however, no support is provided for the upper portion of a patient's body, and the construction of the device is somewhat complex.

What is needed therefore is an improved, inexpensive, and simple inflatable device which may be left in a bed or wheelchair beneath a patient on a semipermanent basis ready for inflation, which is capable of raising the upper portion of a patient's body as well as the hips when inflated and which, despite its capability for upper body support, is flexible enough for convenient use in beds having tiltable sections and can be used equally well in wheelchairs where upper body support from the inflatable device is not desired.

SUMMARY OF THE INVENTION

The present invention overcomes the aforementioned drawbacks and shortcomings of prior art inflatable body supports, and fills the need for an improved means of lifting and supporting bedridden or wheelchair-confined patients for use of a bedpan or a sanitary absorbent material or for treatment of the pelvic or anal region, by providing a body support having one inflatable cushion, for lifting and supporting the upper body, flexibly connected to another inflatable cushion for lifting and supporting the hips and thighs of a patient. The two cushions are selectively inflatable either in unison with, or independently from, each other.

In the body support of the present invention, an inflatable hip-support cushion having a generally "U" shaped configuration, composed of airtight plastic sheet material such as polyurethane or polyethylene, is inflated to support the hips and upper legs of the patient. A space provided between the legs of the "U" of the hip support cushion accommodates a bedpan or sanitary absorbent material or diaper, and a waterproof flexible sheet of material similar to that of the cushion itself extends beneath the bedpan space and the cushion, providing protection against damage to bedding should the contents of the bedpan, etc. be spilled or spattered.

Along the bottom or closed side of the "U" an inflatable back support cushion is attached by an extension of the material of which the hip-support cushion is formed. It comprises a plurality of parallel, elongate, interconnected chambers defined by seams joining together along straight lines the upper and lower plastic layers which form the cushion. These seams thereby form parallel channels between generally cylindrical chambers of the back support cushion when it is inflated. The seams maintain the desired shape of the back support, and the channels provide a means for circulating air beneath the patient, giving an additional benefit of helping to prevent bedsoreness.

It has been found that leaks quickly occur at the points of concentrated stress where an air passage is included in a folding area in an inflatable cushion. The back support cushion of the body support of the invention is attached to the hip support cushion by a narrow area of flexible, uninflatable material contiguous to, but outside, the inflatable portions of either cushions. The flexible material completely separates the air chambers of the two cushions, and includes no air passage joining them to one another. This separate flexible material between the inflated portions of the cushions provides a flexible connection having improved strength and durability, permitting bending of the body support to conform to hospital bed articulation even when fully inflated.

Equally important, the absence of permanent air passage between the two cushions makes it possible to inflate the hip support cushion independently of the back support cushion, and even allows the cushions to be completely separated should it be desired to use one portion separately from the other, as for use of the hip support cushion alone by a wheelchair patient.

An inflation tube is connectable to either the back support or hip support cushion, and additional tubes interconnect the hip-support cushion and the back support cushion for simultaneous inflation from a single source of compressed air. The interconnecting tubes may be clamped off and/or disconnected in a particular fashion to allow either cushion to be independently inflated, thereby permitting inflation of the hip-support cushions only, or varying the height of the hips relative to the upper body by variable degrees of inflation of both cushions, or inflation of the back support cushions only to minimize bedsores on the upper body. The inflation tube may be connected to any convenient source of compressed air, such as that which is commonly available in hospital rooms. An exhaust valve is provided in the hip support cushion, allowing the body support of the invention to be quickly and easily deflated when its support is no longer necessary.

Because the body support of the invention is made of strong flexible plastic material, it may be left in a deflated or semideflated condition beneath the patient for long periods of time without causing discomfort, ready for inflation when needed. The use of a plastic material also provides a device which is economical to produce and which may be kept clean by standard sanitizing methods.

For the above reasons, the body support of the invention is particularly useful for hospital patients under intensive care such as coronary care and acute postoperative care, as well as for orthopedic patients such as those having back injuries.

Accordingly, it is a principal objective of the present invention to provide an improved inflatable body support by which a bed patient may easily be raised to a position for convenient use of a bedpan or sanitary absorbent pad, or for medical treatment of the pelvic or anal regions.

It is another objective of the present invention to provide an economically manufactured inflatable body support which may be easily flexed for use in an articulated hospital bed having a tiltable portion, or in a wheelchair, and to provide in such a body support a flexible portion which is not susceptible to early failure.

It is an additional objective of the invention to provide such a body support having separately inflatable hip-support and upper body support cushions.

It is yet a further objective of the present invention to provide a body support which promotes circulation of air to the skin of a patient supported thereby.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
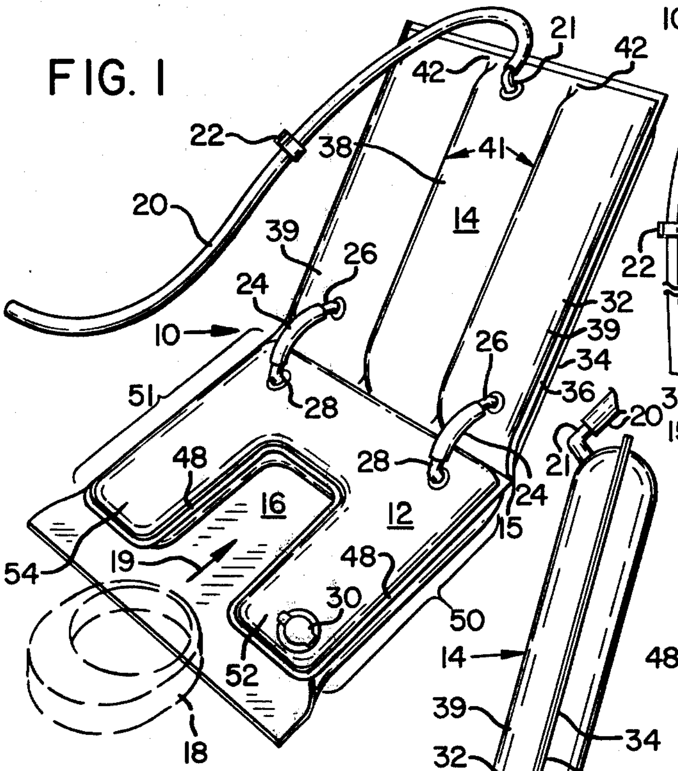
FIG. 1 is a perspective view of a preferred embodiment of the inflatable body support of the invention.
Figure 2:
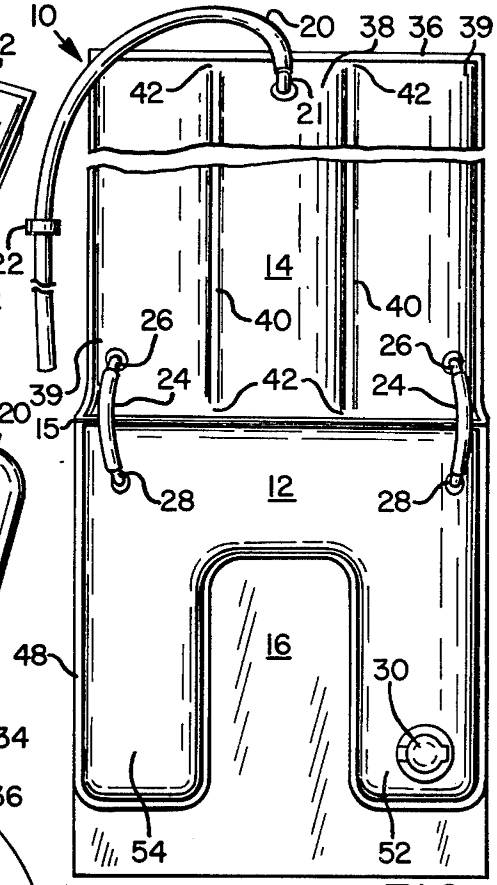
FIG. 2 is a top view of the body support shown in a deflated condition.

Referring to FIGS. 1 and 2, an exemplary embodiment of the inflatable body support 10 of the present invention comprises a U-shaped hip support cushion 12, to the base of which a separately inflatable back support cushion 14 is attached by a flexible, uninflatable folding connecting area 15. The inflatable cushions are preferably made from joined sheets of flexible plastic material such as polyethylene or polyurethane, of sufficient strength to reliably contain air pressure for lifting a heavy patient. A flexible waterproof protective sheet 16, which may be of similar plastic material of lighter weight, is attached to the hip support cushion 12, extending therebeneath to provide protection from matter which may be spilled from a bedpan 18, shown in broken line in FIGS. 1 and 4, or which is not fully absorbed by a sanitary absorbent pad or diaper. Such a bedpan or absorbent material may be inserted where indicated by an arrow 19, where it fits snugly within the "U" of the support cushion 12 when the body support is inflated, as shown in FIG. 1. When inflated, the hip support cushion has a height greater than that of the bedpan 18, thus lifting a patient to a comfortable level for bedpan use.

It may be seen from FIG. 2 that when it is deflated the body support is essentially flat. Because it is flexible, the body support may be inserted under a patient in a well-known manner used for placing bottom bed sheets. This procedure requires only one nurse or attendant, not two as may be required for bodily lifting a patient on to a bedpan. The body support when deflated may also be left in position under the patient. The strong plastic material provides an economically manufactured device which may be kept clean by standard sanitizing methods.

An inflation hose 20 is detachably connected to the back support cushion 14 by an inflation nipple 21, which is preferably of plastic material and attached to the material of the back support cushion in a well-known manner such as a thermally formed joint. Any easily operated device, such as a hose clamp 22, may be used for selectively closing off the inflation hose, allowing the body support of the invention to be inflated and thereafter to be disconnected from the source of inflation air. Inflation normally takes between one and two minutes using a supply of compressed air normally available in a hospital.

Air for inflating the hip support cushion 12 in unison with the back support cushion 14 is provided through a pair of interconnecting flexible tubes 24 which are detachably connected to a pair of nipples 26, mounted in the back support cushion preferably in the same manner as is the inflation hose nipple 21, and a pair of nipples 28 similarly mounted in the hip support cushion 12. It has been found that this is a far better means for transfer of air between such cushions than is the use of one or more interior air passages between ends of an interrupted seam along the folding connection 15, since an interrupted seam in the flexible area creates stress concentrations adjacent the air passages, resulting in early failure of the cushions at those points, as well as reducing flexibility of the body support.

The foregoing structure alternatively permits the back support cushion to be inflated separately from the hip support cushion, when desired to expose the back to air, by clamping the tubes 24. Conversely, when the body support is used in a wheelchair, the hip support cushion can be inflated separately from the back support cushion by clamping one of the tubes 24, detaching the other tube 24 from its nipple 28, and transferring the inflation hose from the nipple 21 to the exposed nipple 28.

An exhaust valve 30 is included in the hip support cushion. This valve may be of any desired design controllably providing a large opening to allow quick deflation of the body support of the invention, but is preferably a plastic valve mounted in the surface of the hip support cushion 12.

Figure 3:
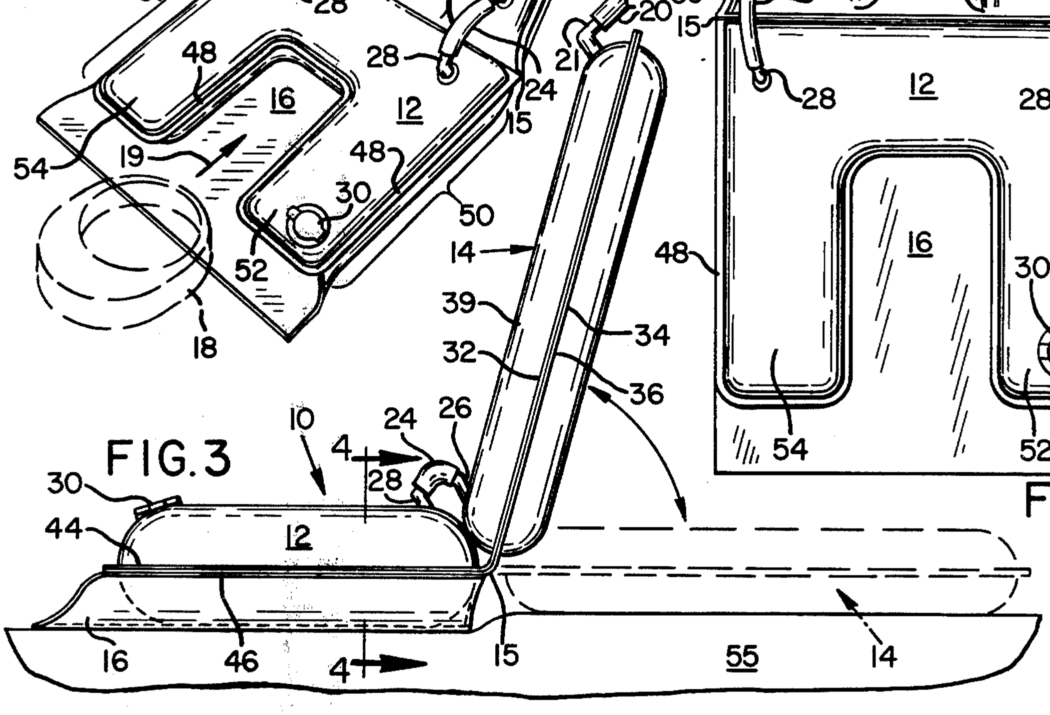
FIG. 3 is a side view of the body support shown in an inflated condition.

Turning now also to FIG. 3, it may be seen that the back support cushion 14 includes two layers of flexible airtight material, an upper layer 32, and a lower layer 34, which are joined together in a peripheral hermetically sealed seam 36, which may be heat-formed. The back support cushion 14 is divided into three elongate tubular air cells, a middle cell 38 and two outer cells 39, by a pair of seams 40 which similarly join the upper layer 32 to the lower layer 34 and cooperatively define a pair of elongate parallel channels 41 therebetween. The seams 40 extend only a part of the length of the back support cushion 14, leaving a small air-passage 42 at each end of each seam, to allow air entering the back support cushion through the inflation hose 20 to fill not only the middle cell 38, but the two outer cells 39 as well.

Figure 4:
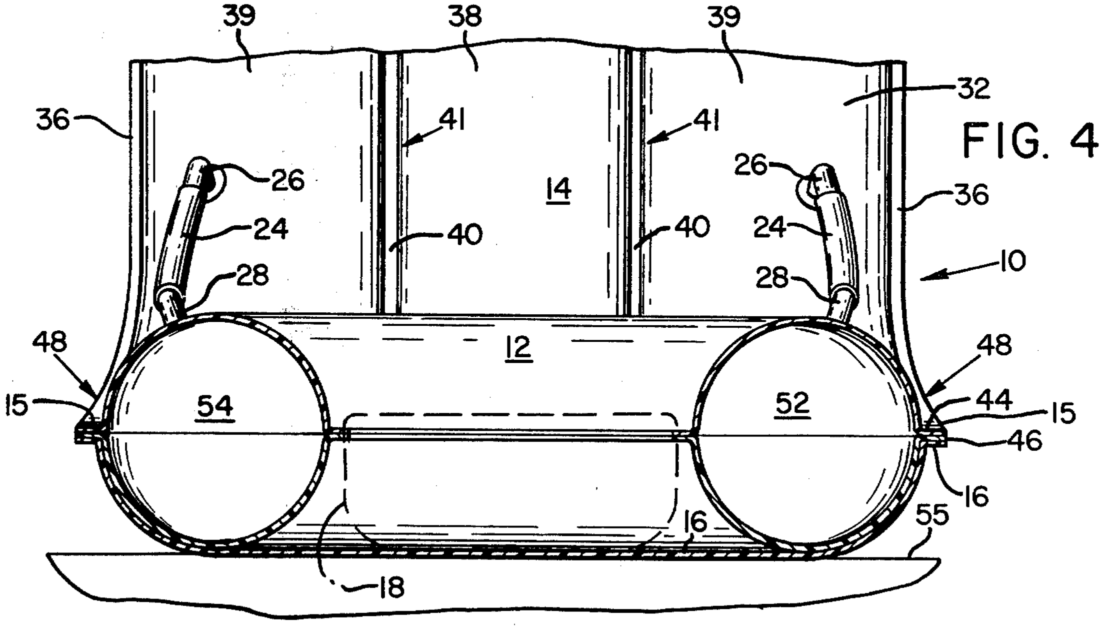
FIG. 4 is a fragmentary sectional front view of the body support shown in FIG. 3, taken along line 4—4.

Referring now also to FIG. 4, the hip support cushion is seen also to comprise an inflatable cushion formed of an upper layer 44 and a lower layer 46 joined together in a hermetically sealed peripheral seam 48. The protective sheet 16 may also be joined to the hip support cushion by inclusion in the portions of the seam 48 along the side portions 50 and 51 and the folding connecting area 15, thus attaching the sheet 16 along three sides thereof and leaving the fourth side unattached.

Inflation of the hip support cushion 12 provides an inflated left leg portion 52 and a similar right leg portion 54 which support respectively the left and right thighs of a patient, facilitating use of the bedpan 18 which may be placed between the left leg and right leg portions of the hip support cushion, once the body support has been inflated to raise the patient above the surface of a bed such as 55. Placement of the bedpan is thus greatly facilitated, and the patient is relieved of pressure from the hard edges of the bedpan.

Turning again to FIG. 3, it may be seen that the body support of the present invention may be used with the back support cushion 14 either in a straight horizontal position as shown in broken line, as in a flat hospital bed 55, or with the back support cushion 14 elevated to any position by means of flexion of the connecting area 15, as when the head of the hospital bed is raised. The channels 41 provide additional comfort to the patient by allowing air to reach the skin and by relieving pressure on parts of the body, thus helping to prevent or heal bed sores in patients unable to turn themselves over.

For bedridden patients who are sensitive to being moved, the body support of the invention may be left beneath the patient, ready for inflation to enable use of the bedpan. Once the bedpan has been removed, the body support may quickly be deflated by opening the exhaust valve 30, comfortably lowering the patient to the surface of the bed 55. Similarly, the body support of the invention may be left in place in a wheelchair to which a patient is confined.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An inflatable body support, comprising:

(a) inflatable hip support cushion means of flexible airtight material, having a generally U-shaped configuration which includes two leg portions and a base portion, for receiving a bedpan in a space defined between said leg portions and for supporting hips and thighs of a patient above said bedpan when said cushion is inflated;

(b) inflatable back support cushion means of flexible airtight material for lifting and supporting the upper body of the patient;

(c) uninflatable flexible connecting means for joining said back support cushion means to said hip support cushion means along said base portion, for allowing said back support cushion means to be articulated with respect to said hip cushion means; and (d) flexible tube means interconnecting both of said cushion means for selectively permitting inflation of said hip support cushion means simultaneously with said back support cushion means and, alternatively, for permitting inflation of said hip support cushion means separately from said back support cushion means.

2. An inflatable body support, comprising:

(a) inflatable hip support cushion means of flexible airtight material, having a generally U-shaped configuration which includes two leg portions and a base portion, for receiving a bedpan in a spaced defined between said leg portions and for supporting the hips and thighs of a patient above said bedpan when said cushion is inflated;

(b) inflatable back support cushion means of flexible airtight material for lifting and supporting the upper body of the patient;

(c) uninflatable flexible connecting means for joining said back support cushion means to said hip support cushion means along said base portion, for allowing said back support cushion means to be articulated with respect to said hip support cushion means; and (d) tube means interconnecting the interiors of each of said infaltable cushion means and selectively disconnectable operatively from the interior of at least one of said cushion means for selectively permitting inflation of both said hip support cushion means and said back support cushion means in unison when said tube means interconnects the interiors thereof and, alternatively, for permitting inflation of one of said cushion means independently of the other of said cushion means when said tube means is disconnected operatively from one of said cushion means.

3. The inflatable body support of claim 2, comprising means defining a first inflation hose connection aperture communicating with the interior of one of said cushion means and means defining a second inflation hose connection aperture communicating with the interior of the other of said cushion means, said first inflation hose connection aperture being separate from said tube means when said tube means interconnects the interior of said respective cushion means.

4. The inflatable body support of claim 3, wherein said tube means is detachably connected to the interior of one of said cushion means so as to communicate therewith through said second inflation hose connection aperture when said tube means interconnects the interior of said respective cushion means.

5. The inflatable body support of claim 4, wherein said second hose connection comprises a nipple attached to one of said cushion means for permitting said tube means to be disconnected at said nipple and permitting an inflation hose to be connected to said nipple.

6. The inflatable body support of claim 2 further comprising flexible waterproof sheet means connected to said hip support cushion means and extending therebeneath between said leg portions thereof for preventing soiling of bedding by matter spilled from said bedpan, the space between said leg portions being free of any rigid member interconnecting said leg portions.

* * * * *